Patented Mar. 6, 1934

1,949,914

UNITED STATES PATENT OFFICE 1,949,914

WATER-RESISTANT ALKALINE SILICATE COMPOSITIONS

Louis Leonard Larson, Wilmington, Del., assignor, by mesne assignments, to The Grasselli Chemical Company, Cleveland, Ohio, a corporation of Delaware No Drawing. Application January 2, 1932, Serial No. 584,567

9 Claims. (Cl. 87—17)

The present invention relates to novel compositions of alkali metal silicates in admixture with substances which impart a considerable degree of water resistance to the silicate films, coatings or products obtained when the soluble alkali metal silicates are used in the arts.

Aqueous solutions of alkali metal silicates, particularly sodium silicates, are used to a very large extent for adhesive and coating purposes. Their employment is based on the property of the silicates to form a strong bonding film on or between surfaces of other materials to which the silicates are applied.

These films and bonds are mainly formed by partial dehydration, such as evaporation or absorption of the water of the silicate solution, whereby a composition of hydrated silica and alkali silicate is formed.

Such compositions are soluble in water and though the solvent action of water thereon is slow, the films or bonds are not highly water resistant.

It is on the other hand well known that acids and salts precipitate silica from alkali metal silicates, whereby the adhesive and film forming properties of the silicate solutions are completely destroyed.

I have found that complex ammine compounds of metals when dissolved in solutions of alkali metal silicates do not precipitate silica and that on partial dehydration such solutions form water resistant films and my invention is directed to the adhesive or coating compositions comprising solutions of alkali metal silicates containing complex ammine compounds of metals and their applications for adhesive, coating and other purposes in which the adhesive film forming properties of alkali metal silicates is made use of.

While I am not prepared to give a theoretical explanation for the fact that complex metal ammines in contradistinction to other electrolytes, particularly the corresponding metal salts free from ammonia, do not decompose silicate solutions, I believe that the water resistant properties of the adhesive films or coatings obtained from such mixed solutions is due to the loss of ammonia or amine during dehydration, whereby the complex ammines are decomposed and the metal salts gradually react to form insoluble silicates which protect the silicate adhesive films against the solvent action of water.

The adhesive and water resistant properties of films and coatings obtained from solutions of alkali metal silicates and ammine complexes are not impaired by the presence in the solutions of other substances intended to modify further the properties of the films. I can add to the silicate-ammine solutions thickening agents, water repellents, water insoluble adhesive substances, flexibility modifying agents, such as glycerine and others, or substances which combine several of these properties. The films and coatings or adhesive bonds produced from such modified silicate-ammine solutions have an excellent water resistance besides the particular properties derived from the presence of the particular modifying agent.

The metal ammines which I have found to give water resistance to silicate films without precipitating silica from silicate solutions and which do not impair the adhesive properties of silicate films, are the complex addition compounds of metal compounds with ammonia or its equivalents such as amines. These compounds are also known by the term ammoniates. Amines of practically every heavy metal are known. They exist for the various valence values of the metals, such as there are cobalto and cobalti ammines, cuprous and cupric ammines, etc. Ammonia and amines add themselves to metal compounds in various proportions. There exists hexammine, pentammine, tetrammine salts, etc. The ammines form normally in aqueous solutions a complex cation containing the metal and ammonia, or amine. Some of the ammines are only known in aqueous solutions, others have been isolated in solid crystalline form. One of the best known ammines is the cupricammino sulfate, the dark blue solution of which is obtained by adding ammonia to an aqueous solution of copper sulfate.

In respect to the silicate solutions to which my invention is applicable the following is noted: With the exception of those of alkaline metals the metal silicates are insoluble in water. The addition of a metal salt of the first order to an alkali metal silicate precipitates therefor an insoluble silicate. Alkali metal silicates are known and used technically with various ratios of $Na_2O$ to $SiO_2$ which range from the meta silicate in which the ratio is 1:1 to silicates with a ratio of 1 $Na_2O$ to 4 or more $SiO_2$.

The excess silica contained in the high ratio silicate solutions is usually considered to exist in a colloidal state. When electrolytes in substantial amounts are added to such solutions, the colloidal bond is broken and hydrated silicic acid precipitated.

Substantial amounts of metal ammines can be added to soluble silicates without precipitating metal silicates or breaking the colloidal bond of the excess silicic acid in high ratio silicate solutions. This holds true for even concentrated, as for instance, 35 to 40° Bé sodium silicate solutions, and such solutions containing up to and even more than 20% of metal ammines based on silicate solids have remained stable for more than eight to ten months.

When the ratio of $SiO_2$ to $Na_2O$ exceeds about 3.8 there is, however, a tendency for the metal ammines to gradually decompose the silicate solutions, the same as ordinary or neutral electrolytes will do immediately, but with sodium silicates as used for adhesive purposes which have ratios from 1:2 to 1:3.5, this tendency for decomposition is not noticeable, and the invention is particularly directed to sodium silicates of this range.

The general procedure for modifying silicate solutions in accordance with my invention is as follows:

An aqueous solution of a complex ammine compound is formed by dissolving a metal salt in water and then adding sufficient aqua ammonia or an amine to first precipitate and then redissolve the metal hydroxide to form a soluble ammine complex. This solution is then added slowly to the sodium silicate solution with thorough agitation. There is in some instances a precipitate formed on the mixing of the two solutions and when freshly prepared the modified silicate contains in most cases a small amount of finely divided precipitate suspended in solution. These precipitates dissolve, however, after the solution has aged for a couple of hours. Too rapid addition of the complex ammine solution or insufficient stirring of the silicate solution results in gelatinous precipitates which dissolve in time, but their solution is very slow. Care must, therefore, be taken that the addition of the ammine and the stirring be regulated so as to form as little precipitate as possible. The so obtained modified silicates are perfectly stable on standing for a long time. They are adjusted to the desired viscosity and used in the same manner as straight sodium silicate solutions for adhesive or coating purposes.

While a large number of complex metal ammines have been tested by me, I found that cupric, zinc and cadmium ammines, particularly those derived from the sulfates, are particularly practical from an economical standpoint for the production of modified sodium silicates which produce water resistant adhesive films, bonds and coatings.

The amounts of metal ammines in sodium silicate solutions of 1 $Na_2O$:3.2 $SiO_2$ ratios which give water resistant films were found, for instance, to correspond to from 0.5% to 21.0% $CuSO_4$ based on the sodium silicate solids of the solution. Slightly higher amounts of cupricammino sulfate could be incorporated, but it is not recommended that the amount of cupricammino-salt be increased substantially above the figure given. As a matter of fact, it is best in most instances to use cupricammino sulfate in amounts corresponding to from 9 to 12% copper sulfate. With silicates of a 1:2.4 ratio amounts of copper ammine sulfate corresponding to 35% copper sulfate have been successfully incorporated into the silicate solution without decomposition.

In the case of cupricammino-chloride 7.7% $CuCl_2$ was found a very convenient amount to produce a stable modified sodium silicate which will form a water resistant film, etc.

In the case of a 2.4 sodium silicate the maximum of cupricammino-chloride which could be incorporated into the silicate was found to correspond to approximately 23% $CuCl_2$.

The amounts of zincammino-sulfate, cadmium-ammino chloride were found to be within the same orders of magnitude.

The preferred concentrations and the approximate limiting concentrations of ammonia were found as follows:

The preferred concentration of ammonia is the amount required to form the soluble complex ammine with the metal salt in aqueous solution. In molar equivalents this corresponds approximately to 4.45 mols of $NH_3$ to 1 mol of $CuSO_4$, 5.65 mols of $NH_3$ to 1 mol of $CuCl_2$, and 7.3 mols of $NH_3$ to 1 mol of $ZnSO_4$. Sodium silicate solutions were successfully modified, using about 2.25 mols of $NH_3$ to 1 mol of $CuSO_4$ or $CuCl_2$. Both these are about the lower limits of concentrations to be recommended, for the reason that these modified silicates were not stable for a period greater than six weeks. An excess of ammonia is not harmful, but is unnecessary and offers no practical advantages.

The following are a few examples showing the application of my invention to the production of modified sodium silicate solutions useful for the formation of water resistant adhesive films, coatings or bonds:

*Example 1:*—45.8 parts of an aqueous solution of copperammino-sulfate as was obtained by mixing 14.4 parts of blue vitriol with 16.5 parts of water and 14.9 parts of aqua ammonia of sp. gr. 0.90, was added slowly to 200 parts of a 42.5° Bé. sodium silicate solution of ratio 1:3.2. The solution was diluted with 14.6 parts of water to bring its viscosity to the viscosity of the original sodium silicate solution. The modified silicate has good adhesive properties and a more rapid rate of set than the original silicate. The water resistivity of its film as an adhesive for paper is illustrated by the following:

Chip-board joints formed by application of the silicate and aged for seven days at room temperature had a life of four days to complete failure under heavy tension in water, compared with twenty minutes' lfe for the straight sodium silicate controlled joints. Bond writing paper joints made and tested as above had a life of three days in water, compared with five minutes for the straight sodium silicate controlled joints. The modified silicate solution was perfectly stable after eight and a half months of age.

*Example 2:*—23.4 parts of a solution of a complex copperammino-sulfate obtained by dissolving 7.2 parts of blue vitriol, 7.7 parts of water and 8.5 parts of aqua ammonia sp. gr. 0.90, were added slowly to 200 parts 35° Bé. sodium silicate solution of ratio 1:3.2, with good stirring and diluted with 17.4 parts of water. An additional amount of copperammino obtained from 36.6 parts of a 20% aqueous solution of blue vitriol was then added and the viscosity adjusted by dilution to that of the original silicate. This solution was stable for at least six weeks and showed an even better water resistance than films obtained from the modified silicate of Example No. 1.

Films produced from such modified sodium silicate solutions when produced for instance, on glass, show a considerably greater resistance to water than straight sodium silicate films. Such films, when broken away from the surfaces on which they were formed, were only slightly dissolved after two months' sojourn in water whereas when made from straight sodium silicate they would dissolve in a few minutes.

*Example 3:*—12.7 parts of soy bean meal was dispersed by grinding in 22.3 parts of water and 65 parts of a 38.5% solution of sodium silicate having a ratio of 1$Na_2O$ to 3.2 $SiO_2$. When the soy bean meal was well dispersed, 194 parts of the silicate solution, 5.1 parts of wood flour, and 7.6 parts of water were added. The solution was next modified with a solution of cupricammino-sulfate consisting of 14.3 parts of blue vitriol, 15 parts of aqua ammonia of 0.90 sp. gr., and 41.3 parts of water. The cupricammino-solution was added slowly with thorough agitation to the modified silicate solution. Then 13.1 parts of blown China-wood oil containing 0.13 parts of the sodium salt of petroleum sulfonic acids was added slowly with thorough agitation of the solution.

The high water resistance of an adhesive having the above composition is illustrated by the following data: Chip-board joints glued with the composition and aged for seven days at room temperature had a life of forty-seven days to complete failure under tension in water, compared with twenty minutes' life for the joints which had been glued with unmodified sodium silicate.

*Example 4:*—45 parts by weight of a solution of the zincammino-sulfate (10 parts $ZnSO_4.7H_2O$, 20 parts water, and 15 parts aqua ammonia, 0.90 sp. gr.) was added to 200 parts of a sodium silicate (42.5° Bé., ratio 1:3.25) diluted with 10 parts of water, with high speed stirring. Then 10 parts of water was added to bring its viscosity to the same value as the original silicate solution.

This modified silicate solution had good adhesive properties, and a more rapid rate of set than the original silicate. For example, a film on glass of this modified silicate dried to tack-free state in three minutes, compared with eight minutes for the original silicate. The so obtained film when flaked from glass and placed in water had not been completely dissolved after four months of contact. Chip-board joints of this adhesive had a life in water of 2½ days, compared with 30 minutes for control joints of the original silicate. This modified silicate solution has shown perfect stability for four months.

The above examples are merely given to illustrate the general procedure, the amounts, the concentrations and types of ammines used for modifying sodium silicate and can be varied within exceedingly wide limits.

The water resistance of the films obtained from my modified sodium silicate solutions can be further improved if water repellent substances are incorporated into the sodium silicate solutions; such substances are, for instance, viscous or semi-solid hydrocarbons, such as paraffine, vaseline, paraffine oil, etc. They are merely emulsified with a modified sodium silicate solution at any step of its preparation. If desired they may be first emulsified separately in water and this emulsion added to the modified sodium silicate solution. These hydrocarbons are easily incorporated into the sodium silicate solutions and though the emulsions have a decided tendency to cream in the absence of agitation, the creamed phase, if formed, can easily be redispersed by stirring. The tendency of the emulsion to cream is greatly reduced by the presence of wood flour in the emulsion; for instance, 10% of the sodium silicate solids content when using amounts of paraffine up to 20%.

The properties of these modified sodium silicate adhesives are as follows:

They have good adhesive properties. Their rate of set is equally as rapid as that of the untreated sodium silicate. They have proven stable for several months. Their films on glass when dry have a high contact angle with a drop of water. Chip-board joints glued with a sodium silicate - copperammino - compound - paraffine - wood-flour composition and aged at room temperature for one week had a life of 10 days to complete failure when placed under tension in water, compared with the four days' life of a similar copperammino-sulfate-sodium silicate solution. It will be seen that the water resistance has been more than doubled by the incorporation of a water repellent and wood flour, the latter acting both as a thickening agent and as a stabilizing agent for the emulsified paraffine.

At normal water content the above composition has a paste-like consistency. As an example, a sodium silicate-copperammino-paraffine composition of paste-like consistency was prepared by adding to the composition described under Example I a 50% water emulsion of paraffine in an amount equal to 50% paraffine based on the silicate solids. The film of the composition on glass was very water repellent, continuous and did not crack or peel and is particularly adapted in the field of coatings and sizes. The composition can, of course, be modified within wide limits, both as to the water repellent and thickening agent and as to the composition of the modified silicate. The composition can likewise be modified further by the addition of pigments which may serve both as thickening agents or dispersing agents for the paraffine, etc., and impart to the compositions a distinct color.

The composition can, for instance, be used as a substitute for asphalt in the paper board industry.

Instead of the water repellent substances, or in addition to them, I can also incorporate in my novel sodium silicate compositions substances which will add to the adhesive properties of the films, particularly water insoluble adhesive substances. Of these I can mention drying oils, such as blown China-wood oil, blown linseed oil, rubber latex, particularly in the concentrated form, and many other water insoluble adhesives. Here again I may use thickening agents which in addition act as stabilizing agents for the adhesive, and I have incorporated into my modified silicate solutions, besides the China-wood and linseed oils, substances, such as wheat flour, starch, pectin, salts of alginic acid, kelp flour, etc.

In another modification of my metal ammine salt containing sodium silicate solutions I add protein containing meals to the solutions, such as soy bean meal or peanut meal in amounts up to 50% based on the silicate solids. The addition of these protein containing meals to the modified silicate solutions influences the rate of set, which is retarded by the addition of the protein substance, whereas the metal ammine rather speeds up the rate of set. It is, therefore, possible to prepare water resistant sodium silicate adhesives varying greatly in their rate of set. The working life of a sodium silicate adhesive solution modified with a complex ammine of copper, zinc, cadmium, etc., and a protein containing meal varies from one-half to seven days, depending on the concentrations of the modifying agents. The working life decreases as the concentration of the complex ammine is increased.

Casein creams rapidly from solutions where a casein preparation solubilized in water with ammonium hydroxide is added to a sodium silicate-ammine solution. I found, however, that the further addition of soy bean meal stabilizes the solution of casein in the modified sodium silicate.

Casein was, for instance, incorporated in amounts up to 20% based on the silicate solids into a sodium silicate solution containing 30% of soy bean meal and 12% copper sulfate as the ammine complex.

The high water resistance of compositions containing soy bean meal, casein, etc. was shown by the following tests:

Chip-board joints glued with ammine modified sodium silicate and a protein meal and aged at room temperature for one week were still in good condition after 50 days of immersion under tension in water. This compares with the life of 20 minutes of a straight sodium silicate joint.

I claim:

1. As an adhesive and coating composition an aqueous solution comprising the reaction product obtained by mixing a solution of an alkali metal silicate with a metalammino salt.

2. As an adhesive and coating composition an aqueous solution comprising the reaction product obtained by mixing a solution of sodium silicate with a metalammino salt.

3. As an adhesive and coating composition an aqueous solution comprising the reaction product obtained by mixing a solution of sodium silicate with a metalammino sulfate.

4. As an adhesive and coating composition an aqueous solution comprising the reaction product obtained by mixing a solution of sodium silicate with a metalammino chloride.

5. As an adhesive and coating composition an aqueous solution comprising the reaction product obtained by mixing a solution of sodium silicate of a $Na_2O:SiO_2$ ratio between 1:1 and 1:3.5 with a metalammino salt of the group of metals consisting of copper, zinc and cadmium.

6. As an adhesive and coating composition an aqueous solution comprising the reaction product obtained by mixing a solution of sodium silicate of a $Na_2O:SiO_2$ ratio between 1:1 and 1:3.5 with a solution of a copperammino salt.

7. As an adhesive and coating composition an aqueous solution comprising the reaction product obtained by mixing a solution of sodium silicate of a $Na_2O:SiO_2$ ratio between 1:1 and 1:3.5 with a solution of a copperammino sulfate.

8. As an adhesive and coating composition an aqueous solution comprising the reaction product obtained by mixing a solution of sodium silicate of a $Na_2O:SiO_2$ ratio between 1:1 and 1:3.5 with a solution of a zincammino salt.

9. As an adhesive and coating composition an aqueous solution comprising the reaction product obtained by mixing a solution of sodium silicate of a $Na_2O:SiO_2$ ratio between 1:1 and 1:3.5 with a solution of a copperammino sulfate, the amount of copperammino sulfate used corresponding to from 0.5 to 21% $CuSO_4$ based on the sodium silicate solids used.

LOUIS L. LARSON.